United States Patent
Joko et al.

(10) Patent No.: US 8,359,023 B2
(45) Date of Patent: Jan. 22, 2013

(54) RADIO COMMUNICATION METHOD, RADIO BASE STATION, RADIO COMMUNICATION TERMINAL AND BASE STATION CONTROLLER

(75) Inventors: Shingo Joko, Yokohama (JP); Takeshi Toda, Yokohama (JP); Taku Nakayama, Yokohama (JP)

(73) Assignee: Kyocera Corporation, Kyoto (JP)

( * ) Notice: Subject to any disclaimer, the term of this patent is extended or adjusted under 35 U.S.C. 154(b) by 744 days.

(21) Appl. No.: 12/375,515

(22) PCT Filed: Jul. 27, 2007

(86) PCT No.: PCT/JP2007/064804
§ 371 (c)(1),
(2), (4) Date: Nov. 6, 2009

(87) PCT Pub. No.: WO2008/013278
PCT Pub. Date: Jan. 31, 2008

(65) Prior Publication Data
US 2010/0113002 A1    May 6, 2010

(30) Foreign Application Priority Data
Jul. 28, 2006    (JP) ................................. 2006-207242

(51) Int. Cl.
*H04W 88/02*    (2009.01)
(52) U.S. Cl. .................................................. 455/422.1
(58) Field of Classification Search ............... 455/422.1, 455/441, 444, 446, 449, 525, 436, 435.2; 370/328, 338
See application file for complete search history.

(56) References Cited

U.S. PATENT DOCUMENTS

| | | |
|---|---|---|
| 5,450,473 A | 9/1995 | Shiotsuki et al. |
| 2001/0053697 A1* | 12/2001 | Nakada .......................... 455/456 |
| 2004/0005897 A1 | 1/2004 | Tomoe et al. |
| 2004/0063430 A1 | 4/2004 | Cave |
| 2005/0197071 A1* | 9/2005 | Yoshida et al. .................. 455/69 |
| 2005/0266852 A1 | 12/2005 | Kitamura ....................... 455/437 |
| 2010/0285811 A1* | 11/2010 | Toda et al. ................. 455/452.1 |

FOREIGN PATENT DOCUMENTS

| | | |
|---|---|---|
| EP | 1398984 A1 | 3/2004 |
| JP | 06209492 A | 7/1994 |
| JP | 09-284200 | 10/1997 |
| JP | 11252613 A | 9/1999 |

(Continued)

OTHER PUBLICATIONS

Official Action issued on Oct. 25, 2010 in the counterpart Korean application with English translation.

(Continued)

*Primary Examiner* — Diane Mizrahi
(74) *Attorney, Agent, or Firm* — DLA Piper (US) LLP

(57) ABSTRACT

A radio communication method acquires a moving speed of a radio communication terminal located in a cell formed by a first radio base station. A second radio base station is requested to radiate a dynamic directional beam in a direction of the cell formed by the first radio base station when the moving speed is equal to or more than a predetermined threshold prior to entering a cell formed by the second radio base station. The radio communication terminal is accommodated in the second radio base station that has transmitted the directional beam in response to the request.

7 Claims, 12 Drawing Sheets

FOREIGN PATENT DOCUMENTS

| | | |
|---|---|---|
| JP | 2002325062 A | 11/2002 |
| JP | 2004-282234 | 10/2004 |
| JP | 2005-347906 | 12/2005 |
| JP | 2006-005597 | 1/2006 |
| KR | 2005-120806 A | 12/2005 |
| WO | WO 03/001834 | 1/2003 |
| WO | WO 2004/095851 A2 | 11/2004 |

OTHER PUBLICATIONS

Korean language office action dated Jun. 29, 2011 and its English language translation for Korean application 1020097001756.

Japanese language office action dated Mar. 15, 2011 and its English language translation for corresponding Japanese application 2006207242.

* cited by examiner

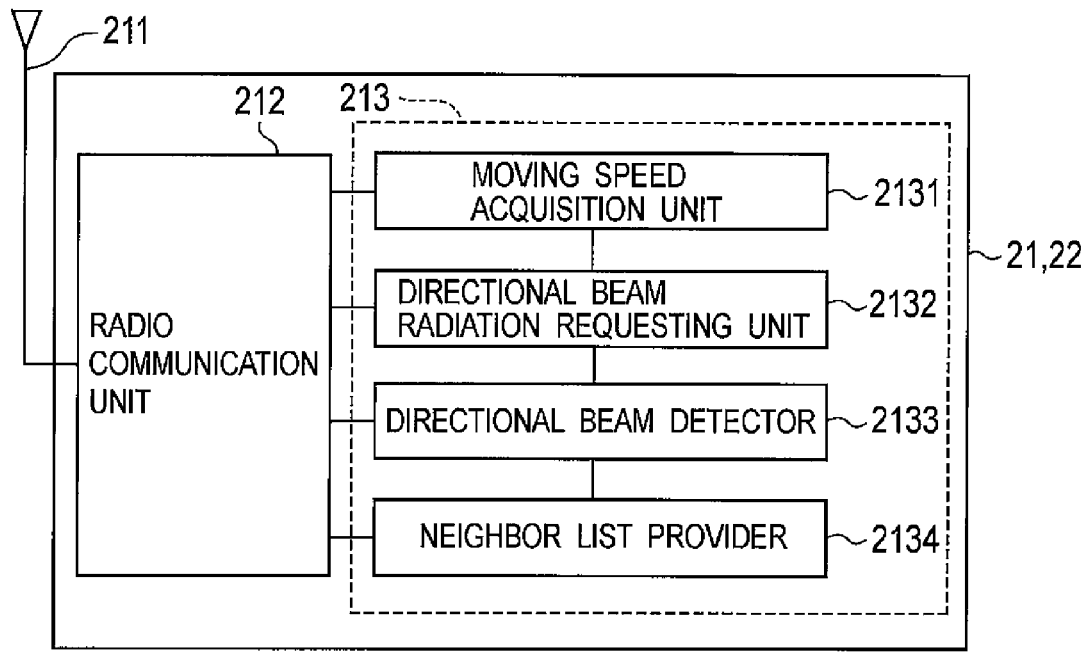

| BASE STATION ID | FREQUENCY DOMAIN | TIME DOMAIN |
|---|---|---|
| BS1 | f1 | t1 |
| BS2 | f1 | t2 |
| BS3 | f2 | t1 |
| ... | ... | ... |

RADIO COMMUNICATION METHOD, RADIO BASE STATION, RADIO COMMUNICATION TERMINAL AND BASE STATION CONTROLLER

TECHNICAL FIELD

The present invention relates to a radio communication method, a radio base station, a radio communication terminal, and a base station controller using an adaptive array antenna that radiates dynamic directional beam.

BACKGROUND ART

Conventionally, in a radio communication system, a radio communication terminal (a mobile phone terminal, for example) receives base station reference signals (pilot signals or the like, for example) from multiple radio base stations, and is accommodated in a radio base station having the strongest received power of the base station reference signal.

In addition, the radio communication terminal is configured to be handed over, when moving, to a radio base station with the strongest received power of the base station reference signal among radio base stations in the periphery, on the basis of peripheral radio station information acquired from a radio base station in which the radio communication terminal is currently accommodated (Patent Document 1, for example).

In such the conventional radio communication system, an entirely-covered service area is provided by locating a radio base station forming a small cell (a small cell base station, below) adjacent to a radio base station (a large cell base station, below) forming a cell (a large cell, below) larger than the small cell.

With reference to FIG. 1, description will be provided for an example of a case where the radio communication terminal moves at high speed in such conventional radio communication system.

As shown in FIG. 1, a radio communication terminal 10 located at a point P01 in a small cell SC1 is accommodated in a small cell base station 21a with the strongest received power of the base station reference signal. Then, as moving in a direction A, the radio communication terminal 10 is handed over from the small cell base station 21a to a large cell base station 22a, at a point P02 where the received power of the base station reference signal from the large cell base station 22a becomes strongest.

Similarly, as moving in the direction A, the radio communication terminal 10 sequentially is handed over from the large cell base station 22a to a small cell base station 21b at a point P03, from the small cell base station 21b to a large cell base station 22b at a point P04, and from the large cell base station 22b to a small cell base station 21c at a point P05.

Additionally, in order to implement space division multiple access (SDMA) technology, an adaptive array antenna technology for radiating directional beams has been applied to each of the small cell base stations 21a, 21b, 21c and the large cell base stations 22a, 22b, the directional beams changing its directionality dynamically. In the adaptive array antenna technology, the small cell base stations 21a to 21c and the large cell base stations 22a to 22b radiate directional beams by tracking the move of the radio communication terminal 10.

In this way, in the conventional radio communication system, while moving, the radio communication terminal is handed over to a radio base station with the strongest received power of the base station reference signal. In addition, the radio base station stabilizes communication quality by radiating directional beams so that the beams can track the move of the radio communication terminal.

Patent Document 1: JP-A 2005-347906

DISCLOSURE OF THE INVENTION

However, in the conventional radio communication system, a radio communication terminal is accommodated in a radio base station with the strongest received power of base station reference signal, among the radio base stations from which the radio communication terminal have received the base station reference signals.

Thus, as shown in FIG. 1, when the radio communication terminal moves at high speed, a handover to a radio base station with the strongest received power of base station reference signal is frequently repeated. Consequently, there is a problem that overhead due to frequent handovers is apt to increase the processing load of a network or reduce the transmission rate.

Moreover, handover processing starts when a radio communication terminal moves to the edge of a cell of a radio base station in which the radio communication terminal is currently accommodated. Thus, when moving at high speed, the radio communication terminal cannot properly establish connection with a radio base station to which the radio communication terminal is to be handed over, thereby causing a problem of disconnection of communications.

In addition, even if the moving speed of the radio communication terminal is constant, the tracking speed of a directional beam from a small cell base station, for example, is faster than the tracking speed of a directional beam from a large cell base station. Thus, when the radio communication terminal moves at high speed, this easily leads to a problem of deterioration of a signal due to a tracking error of the directional beam from the small cell base station.

Hence, an object of the present invention is to provide a radio communication method, a radio base station, a radio communication terminal, and a base station controller that are capable of performing a handover appropriately, reducing frequency of performing the handover and improving communication quality, even when a radio communication terminal moves at high speed in a radio communication system, for example, in which a small cell base station is located adjacent to a large cell base station equipped with an adaptive antenna array.

A first characteristic of the present invention is a radio communication method using a first radio base station and a second radio base station being located adjacent to the first radio base station and including an adaptive array antenna for radiating a dynamic directional beam, the method comprising the steps of: acquiring moving speed of a radio communication terminal located in a cell formed by the first radio base station; requesting the second radio base station to radiate the directional beams in a direction of the cell formed by the first radio base station when the moving speed is equal to or more than a predetermined threshold; and accommodating the radio communication terminal in the second radio base station that has transmitted the directional beam in response to the request.

According to such the characteristic, when the radio communication terminal located in the cell of the first radio base station moves at high speed, the frequency of performing handovers can be reduced since the second radio base station accommodates the radio communication terminal. Accordingly, increase in processing load of a network due to frequent handovers and reduction in transmission rate can be prevented.

In addition, when the radio communication terminal moves at high speed in the cell of the first radio base station, the radio communication terminal is accommodated not in the first radio base station but in the second radio base station. Accordingly, deterioration of signals due to a tracking error of directional beams radiated by the first radio base station can be prevented, and thereby of the communication quality can be improved.

In the first characteristic of the present invention, in the step of requesting, when the moving speed is equal to or more than the predetermined threshold, a plurality of the second base stations may be requested to radiate the directional beams in a direction of the cell formed by the first base station, and in the step of accommodating, the radio communication terminal may be accommodated in one of the second radio base stations that have radiated the directional beams in response to the request.

In the first characteristic of the present invention, the method may further comprise the step of transmitting base station reference signals of a plurality of the second radio base stations, from the second radio base stations by use of the directional beams, wherein the plurality of the base station reference signals differ from each other in frequency domain or time domain.

According to the above characteristic, each of the base station reference signals of the second radio base stations transmitted by directional beam from a plurality of the second radio base stations in the periphery of the cell of the first radio base station differs in frequency domain or time domain. Accordingly, the base station reference signals are prevented from interfering with each other. Thus, the radio communication terminal can receive base station reference signals of a large cell base station transmitted by the directional beams with good receiving quality, and easily select a second radio base station being most appropriate to establish connection with, on the basis of each base station reference signal.

In the first characteristic of the present invention, the method may further comprise the steps of acquiring a list including identification information of the plurality of the second radio base stations that have transmitted the directional beams, and selecting the second radio base station in which the radio communication terminal is to be accommodated, on the basis of the list, wherein the list may include at least one piece of information of a cell radius of the second radio base station, a frequency band of the second radio base station, and an area section indicating an area where the second radio base station is located.

According to such the characteristic, radio communication terminal can easily select the most appropriate second radio base station to establish connection with, on the basis of: the cell radius of the second radio base station that radiates the directional beam; the frequency band of the second radio base station; or the area section of the second radio base station.

In the first characteristic of the present invention, the first radio base station may form a small cell, while the second radio base station may form a large cell being larger than the small cell.

A second characteristic of the present invention is a radio base station located adjacent to a first radio base station and including an adaptive array antenna for radiating a dynamic directional beam, the radio base station comprising: a receiver configured to receive a request to radiate the directional beams in a direction of a cell formed by the first radio base station when moving speed of the radio communication terminal located in the cell formed by the first radio base station is equal to or more than a predetermined threshold, and a directional beam controller configured to accommodate the radio communication terminal by radiating the directional beam in response to the request.

A third characteristic of the present invention is a radio communication terminal in a radio communication system including a first radio base station and second radio base stations each located adjacent to the first base station and each including an adaptive array antenna for radiating a dynamic directional beam, the radio communication terminal comprising: an acquisition unit configured to acquire a list including identification information of the second radio stations that have radiated the directional beams in a direction of a cell formed by the first radio base station, when moving speed of the radio communication terminal in the cell formed by the first base station is equal to or more than a predetermined threshold; and a selector configured to select the second radio base station in which the radio communication terminal is to be accommodated, on the basis of the list; wherein the list includes at least one piece of information of a cell radius of the second radio base station, a frequency band of the second radio base station, and an area section indicating an area where the second radio base station is located.

In the third characteristic of the present invention, the receiver may receive base station reference signals of the second radio base stations transmitted by use of the directional beams from a plurality of the second radio base stations on the basis of the frequency domain and the time domain associated with the identification information of the second radio base stations, and the selector may select the second radio base station in which the radio communication terminal is to be accommodated on the basis of received power of the base station reference signals.

A fourth characteristic of the present invention is a base station controller in a radio communication system, including a first radio base station and a second radio base station located adjacent to the first radio base station and including an adaptive array antenna for radiating a dynamic directional beam, the base station controller comprising: a moving speed acquisition unit configured to acquire moving speed of a radio communication terminal located in a cell formed by the first radio base station; and a requesting unit configured to request the second radio base station to radiate the directional beams in a direction of the cell formed by the first radio base station, when the moving speed is equal to or more than a predetermined threshold.

According to the present invention, in the radio communication system in which the first radio base station is located adjacent to the second radio base station comprising the adaptive array antenna, it is possible to provide a radio communication method, a radio base station, a radio communication terminal, and a base station controller that can perform handovers appropriately, reduce the frequency of performing handovers, and improve communication quality even when the radio communication terminal moves at high speed.

BRIEF DESCRIPTION OF THE DRAWINGS

FIG. 3 is a functional block diagram of a requesting mobile station according to the embodiment of the present invention.

FIG. 4 is a table showing an example of a neighbor list according to the embodiment of the present invention.

BEST MODE FOR CARRYING OUT THE INVENTION

Schematic Configuration of a Radio Communication System According to the Embodiment A schematic configuration of a radio communication system according to the embodiment will be described with reference to FIG. 2.

Figure 1:
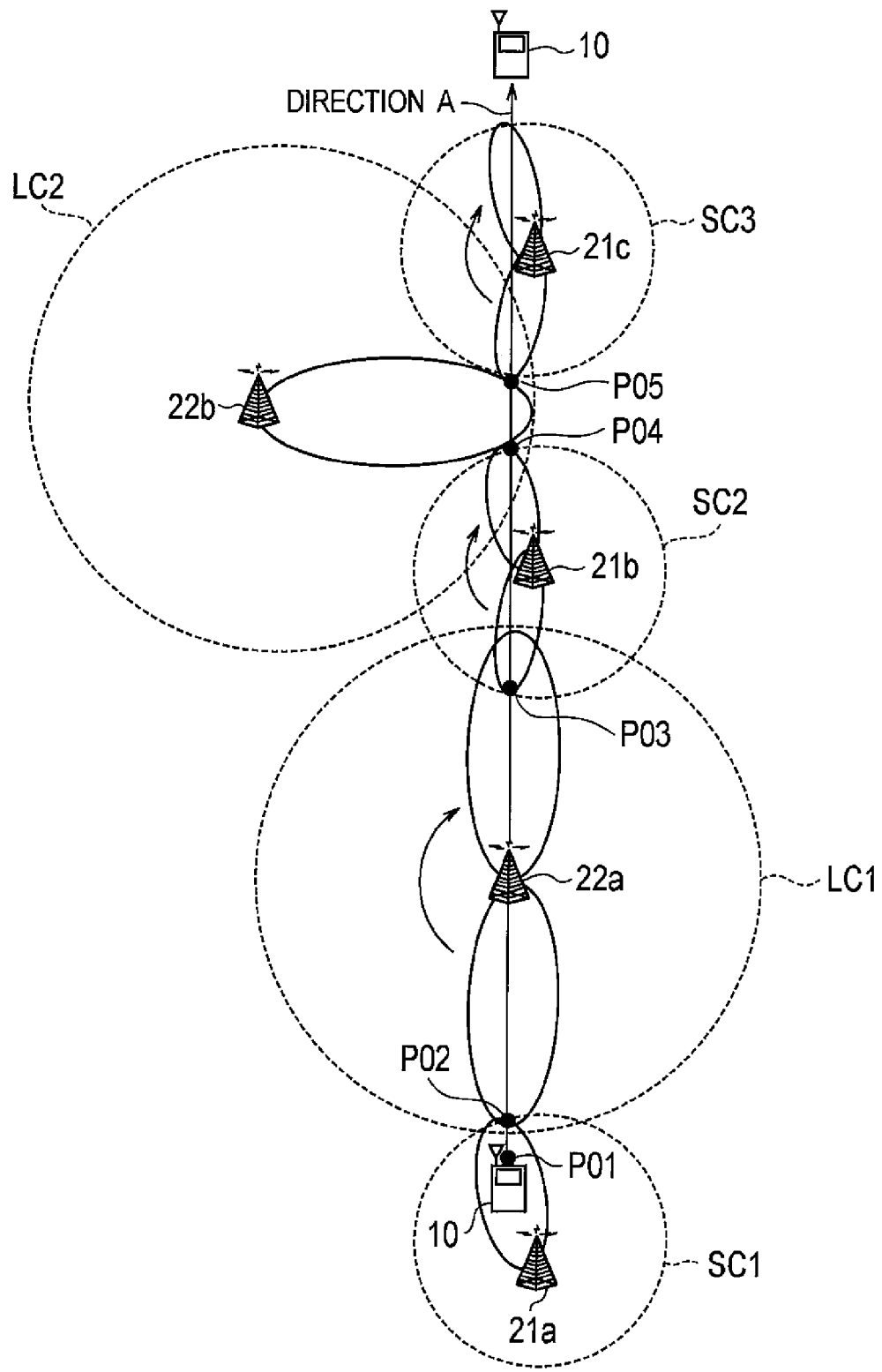
FIG. 1 is an overall schematic configuration diagram of a conventional radio communication system.
Figure 2:
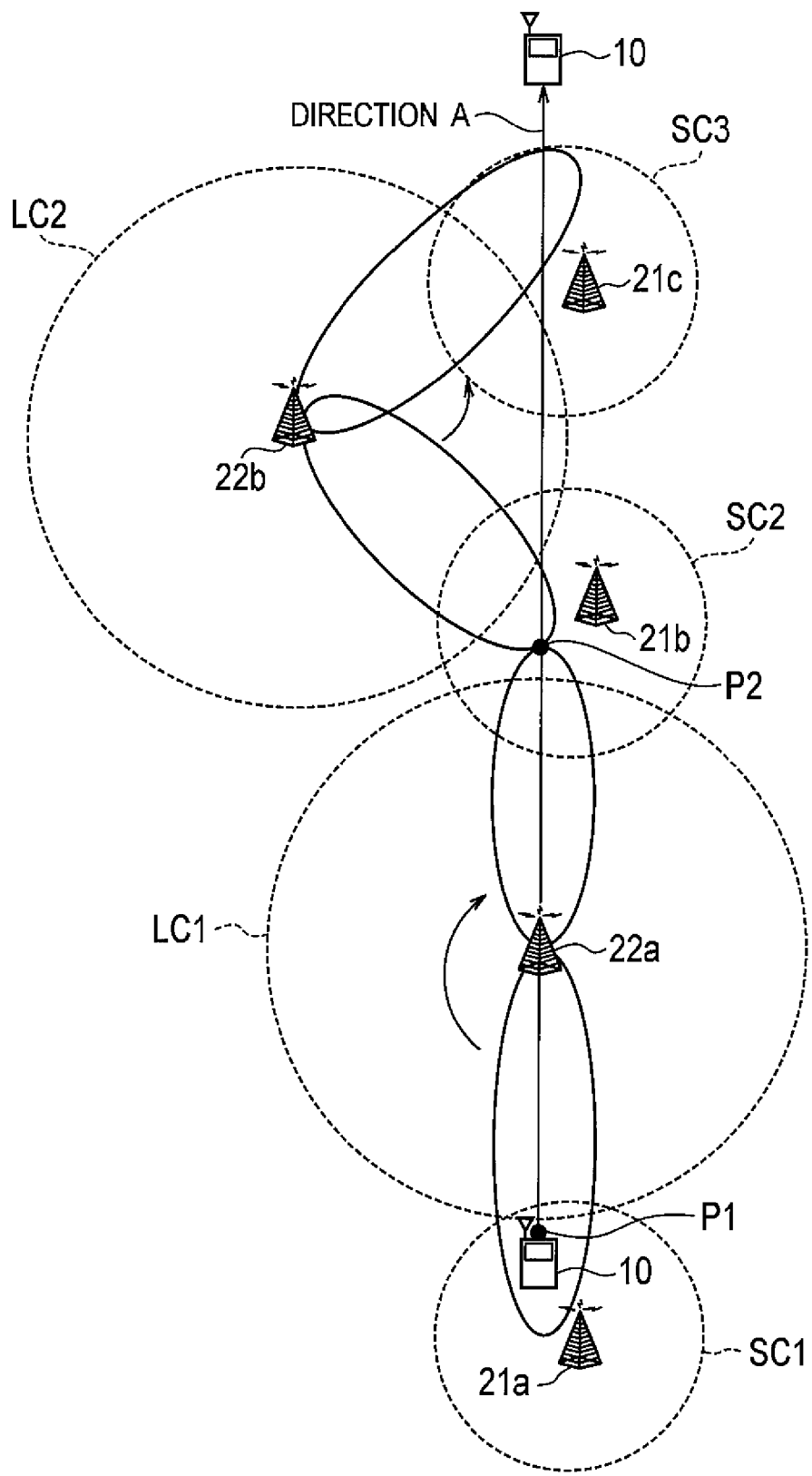
FIG. 2 is an overall schematic configuration diagram of a radio communication system according to embodiments of the present invention.

As shown in FIG. 2, in the radio communication system according to the embodiment, small cell base stations (first base stations) 21a, 21b, 21c forming small cells SC1, SC2, SC3, respectively, are located adjacent to large cell base stations (second radio base stations) 22a, 22b forming large cells LC1, LC2, respectively.

Additionally, the small cell base stations 21a to 21c and the large cell base stations 22a to 22b are connected to a radio line control station (RNC), although it is not shown.

Each of the small cell base stations 21a, 21b, 21c herein is a radio base station forming a cell with a small service area (a small cell). Each of the large cell base stations 22a, 22b is a radio base station forming a cell with a larger service area (a large cell) than the small cell.

Note that, each cell size is determined based on a cell radius of the radio base station, a frequency band of the radio base station, or an area section indicating an area where the radio base station is located.

For example, when a cell with a cell radius of a predetermined threshold (1000 m, for example) or less is formed, a cell base station may be referred to as one of the small cell base stations 21a . . . , while when a cell with a cell radius of the predetermined threshold (1000 m, for example) or more is formed, a cell base station may be referred to as one of the large cell base stations 22a . . . .

In addition, a signal transmitted in a lower frequency generally reaches far as it is easily diffracted. Thus, when a signal is transmitted in a frequency band higher than a predetermined frequency, a cell base station may be referred to as one of the small cell base stations 21a . . . , while when a signal is transmitted in a frequency band lower than a predetermined frequency, a cell base station may be referred to as one of the large cell base stations 22a . . . .

In addition, a cell radius is generally set smaller in an urban area where there is large number of users. Thus, if an area section indicating an area where a radio base station is located is set to "a densely populated urban area (where the cell radius corresponds to less than 500 m)" or "an urban area (where the cell radius corresponds to 500 m or more and less than 1000 m)", a cell base station may be referred to as one of the small cell base station 21a . . . . If the area section is set to "a suburban area (where the cell radius is 1000 m or more and less than 2000 m)" or "a rural area (where the cell radius corresponds to 2000 m or more)", a cell base station may be referred to as one of the large cell base stations 22a . . . .

Consider a case where the radio communication terminal 10 moves in a direction A at high speed within the small cell SC1, the large cell LC1, the small cell SC2, the large cell LC2, and the small cell SC3, as shown in FIG. 2. In this case, the radio communication system according to the embodiment differs from a communication system according to the prior art in that the radio communication terminal is not accommodated in the small cell base stations 21a, 21b, 21c, and only accommodated in the large cell base stations 22a, 22b.

Specifically, in the radio communication system shown in FIG. 2, the radio communication terminal 10 located at a point P1 in the small cell SC1 connects to the large cell base station 22a that radiates directional beams directed toward the small cell SC1, on the basis of a request from the small cell base station 21a. The large cell base station 22a accommodates the radio communication terminal 10.

In addition, the radio communication terminal 10 located at a point P2 where the large cell LC1 and the small cell SC2 overlap is handed over to the large cell base station 22b that radiates directional beams directed toward the small cell SC2, on the basis of a request from the large cell base station 22a. The large cell base station 22b accommodates the radio communication terminal 10.

Note that, the large cell base station 22a and the large cell base station 22b track so as to radiate directional beams in the direction A of the radio communication terminal 10.

In this way, in the radio communication system according to the embodiment, the large cell base stations 22a . . . in the periphery radiates directional beams in response to a request to radiate directional beam radiation request in a small cell direction (hereinafter referred to as a "small cell direction") in which the radio communication terminal 10 is located. This reduces the frequency of case where the radio communication terminal 10 moving at high speed is accommodated in the small cell base stations 21a . . . .

Hereinafter, in the embodiment, the small cell base stations 21a . . . and the large cell base stations 22a . . . that request for radiation of directional beams are referred to as "requesting base stations". In addition, the large cell base stations 22a . . . that radiates directional beams in response to a request from the requesting base stations are referred to as "requested base stations."

In addition, the small cell base stations 21a, 21b, 21c ... are collectively referred to as the small cell base station 21, while the large cell base stations 22a, 22b . . . are collectively referred to as the large cell base station 22.

Functional Block Configuration of the Requesting Base Stations

A block configuration of the requesting base stations used in the radio communication system according to the embodiment will be specifically described with reference to FIG. 3 and FIG. 4. Note that, in the following, parts related to the present invention will be mainly described. Therefore, it should be noted that the requesting base stations may include a functional block (such as a power supply unit or the like) that is essential to implement functions as the device but is not shown or omitted of description.

The small cell base station 21 and the large cell base station 22 that operate as the requesting base stations include an antenna 211, a radio communication unit 212, and a controller 213.

The antenna 211 is an adaptive array antenna formed of multiple antenna elements. The antenna 211 is controlled by the controller 213 so as to a radiate directional beam whose directionality changes dynamically.

The radio communication unit 212 performs radio communications by SDMA with the radio communication terminal 10 via the antenna 211.

The radio communication unit 212 also performs communications with the large cell radio station 22 that is the requested base stations via the radio line control station or a network. In particular, the radio communication unit 212 transmits a directional beam radiation request to the large cell base station 22 in the periphery, on the basis of an instruction of a directional beam radiation requesting unit 2132 of the controller 213.

The controller 213 includes a moving speed acquisition unit 2131, the directional beam radiation requesting unit 2132, a directional beam detector 2133, and a neighbor list provider 2134.

The moving speed acquisition unit 2131 acquires information indicating moving speed of the radio communication terminal 10. Specifically, when entering a network, the moving speed acquisition unit 2131 acquires information indicating the moving speed from the radio communication terminal 10, in connection request processing from the radio communication terminal 10.

Moreover, the moving speed acquisition unit 2131 may estimate moving speed on the basis of position information of the radio communication terminal 10 to be acquired from the radio communication terminal 10 at predetermined time intervals.

The directional beam radiation requesting unit 2132 requests the large cell base station 22 in the periphery of the small cell in which the radio communication terminal 10 is located to radiate a directional beam directed toward the small cell, when moving speed of the radio communication terminal 10 is equal to or more than a predetermined threshold.

Herein, the small cell in which the radio communication terminal 10 is located may not necessarily be a small cell formed by the small cell base station 21 to which the radio communication terminal 10 is connecting. The small cell includes a small cell formed by the small cell base station 21 that is a connection request target or a handover target of the radio communication terminal 10.

In addition, the radiation request described above includes information indicating a small cell in which the radio communication terminal 10 is located. Further, the radiation request described above may include moving speed of the radio communication terminal 10 the moving speed acquired by the acquisition unit 2131, position information of the radio communication terminal 10 or the like.

In addition, the directional beam radiation requesting unit 2132 controls the base station so that a generated radiation request is transmitted to the large cell base station 22 in the periphery on the basis of a neighbor list to be described later. Note that, as shown in FIG. 4, the neighbor list includes information related to the large cell base station 22 in the periphery and is acquired via an upper network.

For example, the directional beam radiation requesting unit 2132 controls the base station so that the generated radiation request is transmitted to a predetermined number of the large cell base stations 22 with the largest cell radiuses among the large cell base stations 22 listed in the neighbor list, in descending order of the cell radius or simultaneously.

Similarly, the directional beam radiation requesting unit 2132 may control the base station so that the generated radiation request is transmitted to a predetermined number of the large cell base stations 22 transmitting signals in the lowest frequency bands among the large cell base stations 22 listed in the neighbor list, in ascending order of the frequency band or simultaneously.

Moreover, the directional beam radiation requesting unit 2132 may control the base station so that the generated radiation request is transmitted to a predetermined number of large cell base stations 22 with the area section being a "suburban area" or "rural area" (where the cell radius corresponds to 1000 m or more, for example), among the large cell base stations 22 listed in the neighbor list, in the order from the "suburban area" or simultaneously.

The directional beam detector 2133 detects a directional beam radiated in the direction of a small cell in which the radio communication terminal is located from the large cell base station 22 in the periphery, in response to a directional beam radiation request. For example, the directional beam detector 2133 detects that the directional beam have been radiated in response to the directional beam radiation request by measuring received power of the base station reference signal from the large cell base station 22 in the periphery.

The neighbor list provider 2134 provides the radio communication terminal 10 with a neighbor list including information on the large cell station 22 whose directional beam radiation have been detected by the directional beam detector 2133.

As shown in FIG. 4, such neighbor list includes: so identification information of the large cell base station 22 that radiates a directional beam in response to the radiation request; and a cell radius of such large cell base station 22, a frequency band of such large cell base station 22 or the area section indicating an area in which such large cell base station 22 is located. The neighbor list may also include position information of the large cell base station 22.

Additionally, such the neighbor list includes information on the small cell base station 21 in the periphery, similar to the information on the large cell base station 22 as described above. The neighbor list may also include information on all the large cell base stations 22 which is the radiation requesting target of a directional beam.

The neighbor list may also be classified on the basis of a cell radius, a frequency band or an area section of the small cell base station 21 and the large cell base station 22. For example, it may be classified into a neighbor list including only the small cell radio station 21 with the cell radius of 1000 m or less, a neighbor list including only the large cell base station 22 with the cell radius of 1000 m to 2000 m, and a neighbor list including only the large cell base station 22 with the cell radius of 2000 m or more.

In this way, the neighbor list classified by the predetermined cell radius, the neighbor list classified by the predetermined frequency band, or the neighbor list classified by the area section are provided. Accordingly, the cell search processing in the radio communication terminal 10 can be simplified.

(Functional Block Configuration of Requested Base Stations)

Figure 5:
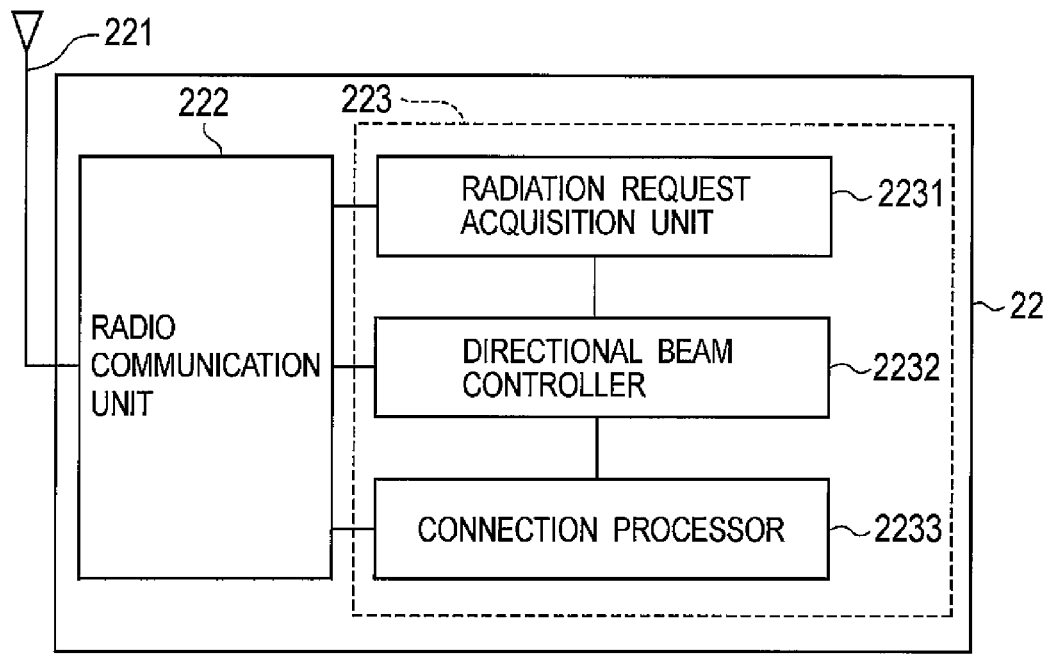
FIG. 5 is a functional block diagram of a requested mobile station according to the embodiment of the present invention.

A block configuration of the requested base stations used in the radio communication system according to the embodiment will be specifically described with reference to FIG. 5. Note that, in the following, parts related to the present invention will be mainly described. Therefore, it should be noted that the requested base stations may include a functional block (such as a power supply unit or the like) being essential to implement functions as the device but is not shown or omitted of description.

The large cell base station 22 that operate as the requested base station includes an antenna 221, a radio communication unit 222, and a controller 223.

The antenna 221 is an adaptive array antenna formed of multiple antenna elements. A phase and amplitude of the multiple antenna elements is adaptively controlled by a directional beam controller 2232 of the controller 223, and the antenna 221 radiates a directional beam whose directionality changes dynamically.

The radio communication unit 222 performs radio communications by SDMA with the radio communication terminal 10 via the antenna 221.

The radio communication unit 222 also performs communications with the large cell base station 22, which is the requesting base station via the radio line control station or a network.

The controller 223 includes a radiation request acquisition unit 2231, a directional beam controller 2232, and a connection processor 2233.

The radiation request acquisition unit 2231 acquires a request to radiate a directional beam directed toward the small cell in which the radio communication terminal 10 is located, from the requesting base station described above.

In response to the radiation request from the requesting base station, the directional beam controller 2232 performs the radiation control of the directional beam directed toward the small cell in which the radio communication terminal 10 is located.

Specifically, when the radiation request acquisition unit 2231 acquires the request to radiate a directional beam, the directional beam controller 2232 controls the antenna 221 so as to radiate directional beam directed toward the small cell, on the basis of information indicating the small cell which is included in the radiation request.

In addition, the directional beam controller 2232 may control beam width of the directional beam directed toward the small cell, on the basis of moving speed of the radio communication terminal 10 included in the radiation request described above. For example, when the moving speed of the radio communication terminal 10 is equal to or more than a predetermined threshold, the directional beam controller 2232 controls the antenna 221 so as to radiate a beam to the entire small cell (see FIG. 8).

Moreover, the directional beam controller 2232 may control beam width of the directional beam directed toward the small cell, on the basis of position information (that may include information indicating the moving direction of the radio communication terminal 10) of the radio communication terminal 10 included in the radiation request described above. For example, based on the position information of the radio communication terminal 10, the directional beam controller 2232 controls the antenna 221 so as to a radiate narrow beam directed to the position of the radio communication terminal 10 in the small cell.

The connection processor 2233 accommodates the radio communication terminal 10 in its own station, by performing connection processing with the radio communication terminal 10. Specifically, the connection processor 2233 performs the connection processing with the radio communication terminal 10, in response to a connection request to its own station from the radio communication terminal 10 when entering a network, or a request for a handover to its own station from the radio communication terminal 10.

(Block Configuration of Radio Communication Terminal)

Figure 6:
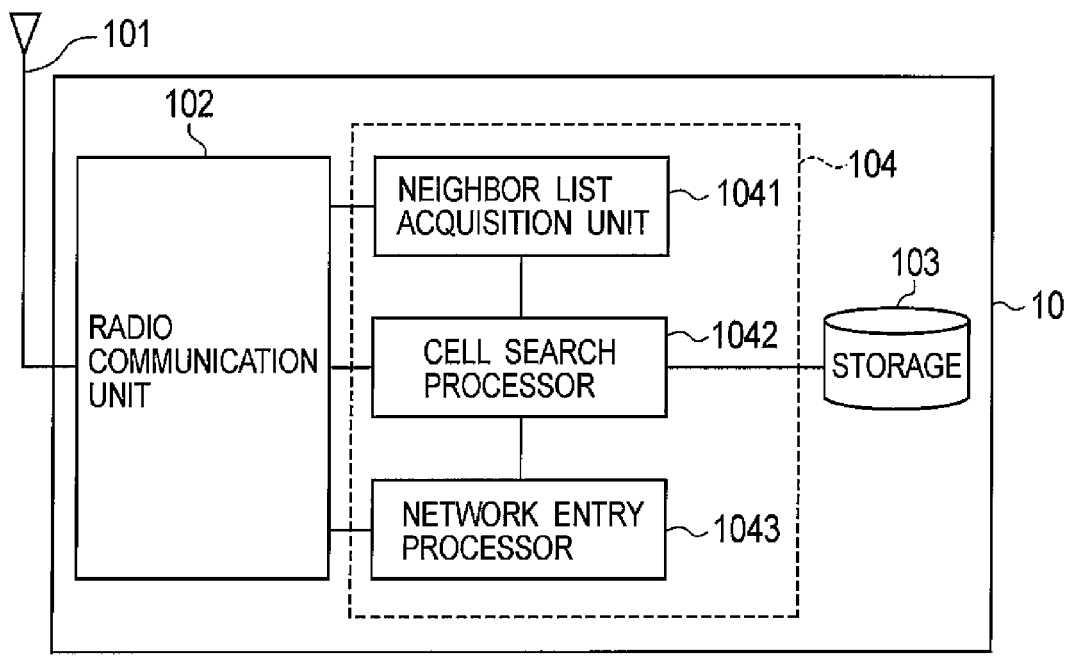
FIG. 6 is a functional block diagram of a radio communication terminal according to the embodiments of the present invention.

A block configuration of the radio communication terminal 10 used in the radio communication system according to the embodiment will be specifically described with reference to FIG. 6 and FIG. 7. Note that, in the following, parts related to the present invention will be mainly described. Therefore, it should be noted that the radio communication terminal 10 may include a functional block (such as a power supply unit or the like) being essential to implement functions as the device but is not shown or omitted of description.

The radio communication terminal 10 includes an antenna 101, a radio communication unit 102, a storage 103, and a controller 104.

The antenna 101 is an adaptive array antenna formed of multiple antenna elements. The antenna 101 is controlled to increase gain in the direction of a large cell, on the basis of position information of the large cell base station 22 included in the neighbor list described above.

The radio communication unit 102 performs radio communications by SDMA with the small cell base station 21 and the large cell base station 22 via the antenna 101.

Figures 7, 8:
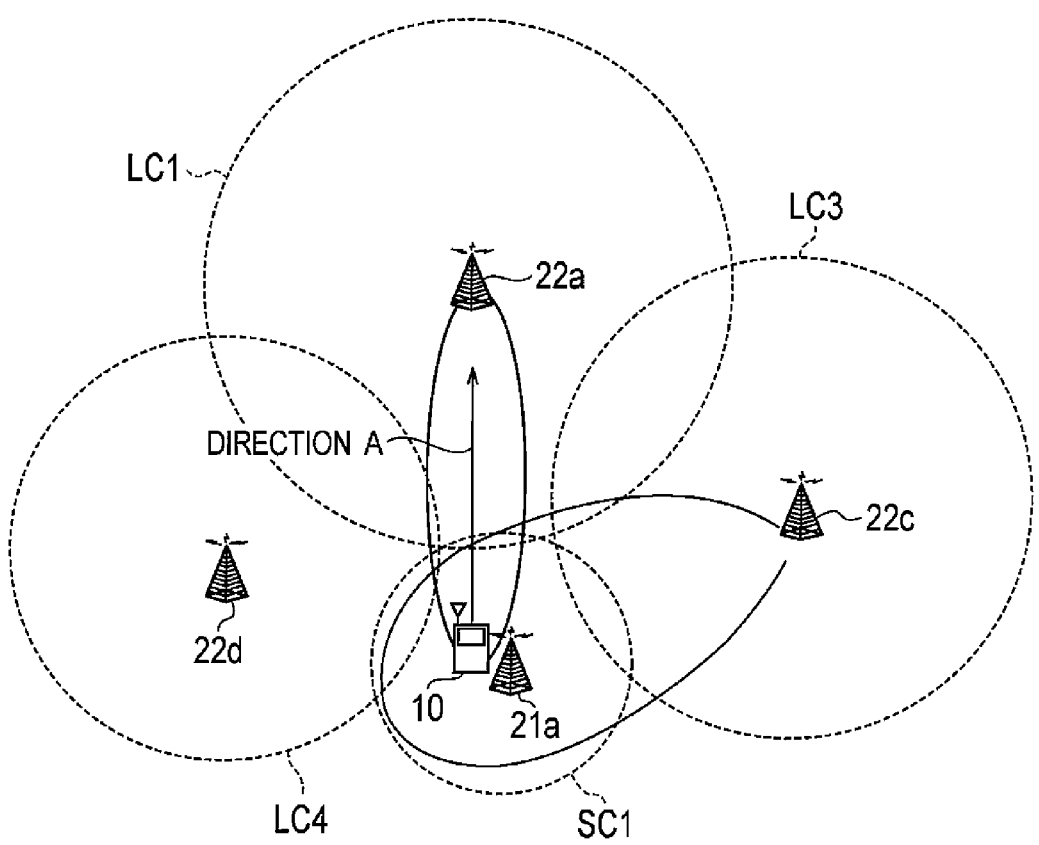
FIG. 7 is a table showing an example of a storage of the radio communication terminal according to the embodiments of the present invention.
FIG. 8 is a diagram showing an example in which the radio communication terminal according to the embodiments of the present invention enters a network.

As shown in FIG. 7, the storage 103 associates and stores base station IDs for identifying the small cell base station 21 and the large cell base station 22 with frequency domains and time domains in which base station reference signals (pilot signals or the like, for example) from the small cell base station 21 and the large cell base station 22 are transmitted. Here, the frequency domain refers to frequency in which the base station reference signals are transmitted. Meanwhile, the time domain refers to a time slot in which the base station reference signals are transmitted.

The controller 104 includes a neighbor list acquisition unit 1041, a cell search processor 1042, and a connection processor 1043.

In response to a radiation request from the requesting base station, the neighbor list acquisition unit 1041 acquires a neighbor list including information on the large cell base station 22 that have radiated a direction beam.

As described above, such the neighbor list includes: identification information of the large cell base station 22 that have radiated directional beam in response to the radiation request from the requesting base station; and a cell radius of the large cell base station 22, a frequency band of the large cell base station 22, or an area section indicating an area in which the large cell base station 22 is located.

The cell search processor 1042 performs cell search processing on the basis of the acquired neighbor list, and selects a large cell base station 22 to establish connection with.

Specifically, the cell search processor 1042 refers to the storage 103, and acquires the frequency domain and the time domain that are associated with the identification information of the small cell base station 21 and the large cell base station 22 listed in the neighbor list. The cell search processor 1042 acquires a base station reference signal from each of the small cell base station 21 and the large cell base station 22, on the basis of the acquired frequency domain and time domain.

The cell search processor 1042 selects a large cell base station 22 with the largest cell radius listed in the neighbor list from the small cell base stations 21 and the large cell base stations 22 with received power of the acquired base station reference signal is equal to or more than a predetermined threshold, that is the small cell base stations 21 and the large cell base stations 22 that can be connected.

Moreover, the cell search processor 1042 may measure the received power of the base station reference signals in the order of the large cell base station 22 with the largest cell radius listed in the neighbor list, and select a large cell base station 22 with the received power of the base station reference signal being equal to or more than the predetermined threshold first.

In addition, the cell search processor 1042 may select a large cell base station 22 with the largest received power of the base station reference signals, among the large cell base stations 22 with the cell radius being equal to or more than listed in the neighbor list.

Similar to the size of cell radius described above, the cell search processor 1042 may select a large cell base station 22 to establish connection with, on the basis of height of a frequency band or an area section listed in the neighbor list.

The connection processor 1043 performs connection processing with the small cell base station 21 and the large cell base station 22. Specifically, when entering a network, the radio communication terminal 10 requests for connection to a small cell base station 21 or a large cell base station 22 with the strongest received power of the base station reference signal, and performs the connection processing. The connection processor 1043 also requests a handover to a handover source or a handover destination when the radio communication terminal 10 performs the hands over, and performs the handover processing.

In addition, in the connection request processing when entering the network or the handover request processing, the connection processor 1043 may notify a small cell base station 21 or a large cell base station 22 which is a requesting target of moving speed measured based on the position information of the radio communication terminal 10.

Communication Method of Radio Communication System According to the Embodiment

A communication method in a radio communication system according to the embodiment will be described hereinafter with reference to FIG. 8 to FIG. 15.

(1) Network Entry

Operation performed when the radio communication terminal 10 moving at high speed in a small cell enters a network will be described with reference to FIG. 8 and FIG. 9. Here, as shown in FIG. 8, the radio communication terminal 10 moves at high speed in a small cell SC1 in a direction A (from the small cell base station 21a to the small cell base station 21b (not shown in FIG. 8)).

Figure 9:
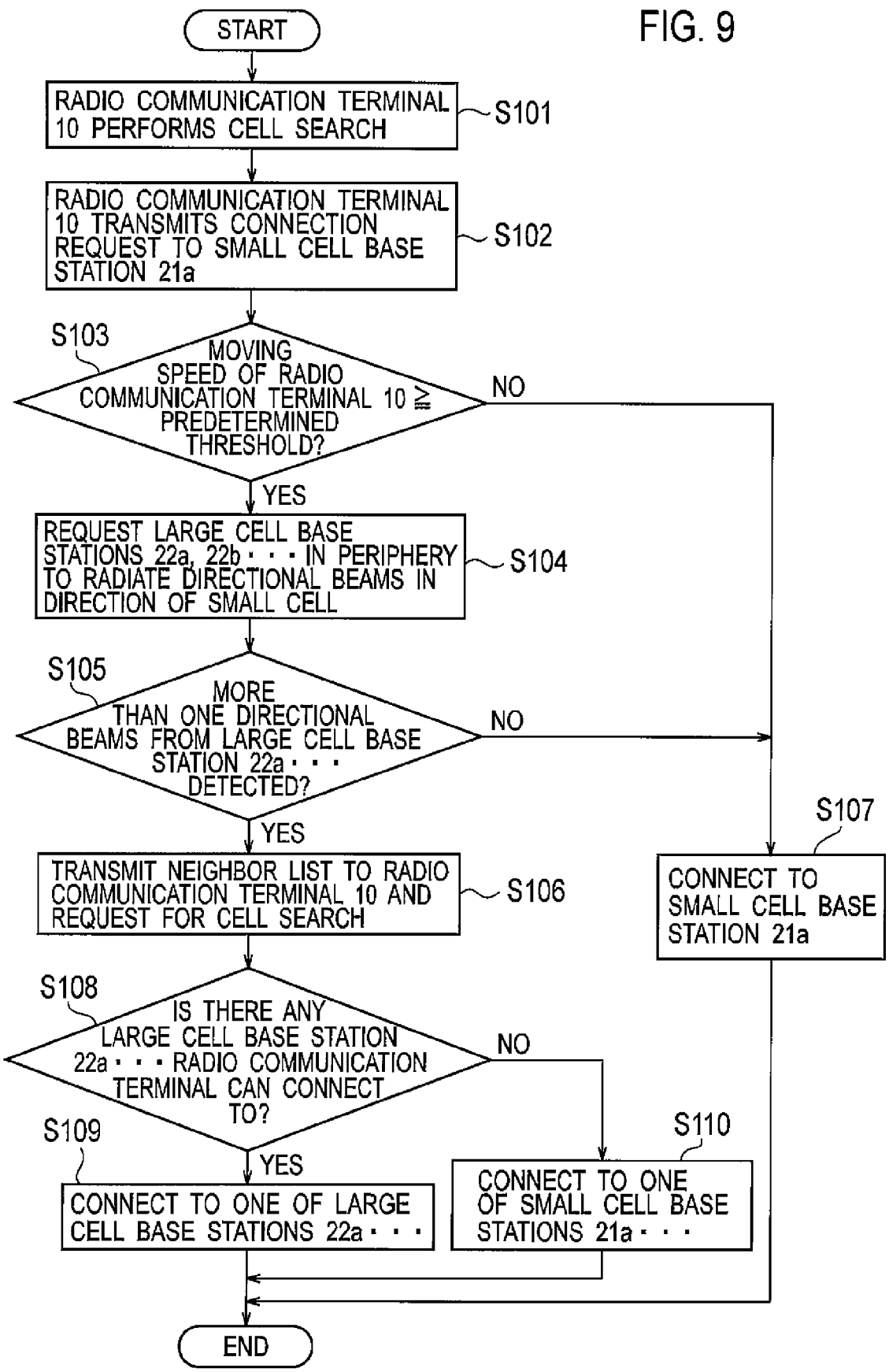
FIG. 9 is a flowchart showing operations of the radio communication terminal according to the embodiments of the present invention when entering a network.

As shown in FIG. 9, in step S101, when entering the network, the radio communication terminal 10 moving at high speed in the small cell SC1 performs cell search, and receives base station reference signals from the small cell base stations 21a . . . and the large cell base stations 22a . . . in the periphery. For example, in FIG. 8, the radio communication terminal 10 receives the base station reference signals from the small cell base station 21a and the large cell base stations 22a, 22c, 22d.

In step S102, the radio communication terminal 10 transmits a connection request to the small cell base station 21a with the largest received power of the base station reference signal.

In step S103, receiving a connection request from the radio communication terminal 10, the small cell base station 21a determines whether or not moving speed of the radio communication terminal 10 is equal to or more than a predetermined threshold (the threshold is 80 km/h, for example). If the moving speed of the radio communication terminal 10 is equal to the threshold or more, the small cell base station 21a operates as a requesting base station described above, and the operation proceeds to step S104.

Meanwhile, if the moving speed of the radio communication terminal 10 is less than the predetermined threshold, the operation proceeds to step S107. In step S107, the radio communication terminal 10 connects to the small cell base station 21a.

In step S104, the small cell base station 21a transmits a request to radiate a directional beam directed toward the small cell SC1 to the large cell base stations 22a . . . in the periphery, on the basis of a neighbor list acquired from the upper network. In FIG. 8, for example, the small cell base station 21a transmits a request, to the large cell base stations 22a, 22c, 22d in the periphery, to radiate a directional beam.

In step S105, the small cell base station 21a detects whether or not the one or more large cell base stations 22a . . . have radiated the directional beams directed toward the small cell SC1. If the direction beams directed toward the small cell SC1 from the more than one large cell base station 22a . . . have been detected, the operation proceeds to step S106.

Meanwhile, if no directional beam directed toward the small cell SC1 from any of large cell base stations 22a . . . could be detected (such a case may occur depending on load condition at the each of the large cell base stations 22a . . . or condition of a propagation channel or the like), the operation proceeds to step S107. In step S107, the radio communication terminal 10 connects to the small cell base station 21a.

In step S106, the small cell base station 21a provides the radio communication terminal 10 with the neighbor list including information on the large cell base stations 22a . . . that have radiated directional beams directed toward the small cell SC1, and requests the radio communication terminal 10 to perform the cell search. In FIG. 8, for example, the small cell base station 21a provides the radio communication terminal 10 with the neighbor list including information on the large cell base stations 22a, 22c that have radiated directional beams directed toward the small cell SC1.

In step S108, the radio communication terminal 10 performs the cell search on the basis of the neighbor list provided in step S106. The radio communication terminal 10 also determines whether or not there exists the large cell base station 22a with the received power of the base station reference signal equal to or more than the predetermined threshold, that is, the large cell stations 22a in the periphery to which the radio communication terminal 10 can establish connection with.

If there exists the large cell base stations 22a . . . in the periphery to which the radio communication terminal 10 can connect, in step S109, the radio communication terminal 10 connects to one of the large cell base stations 22a . . . , on the basis of the neighbor list provided in step S106. For example, in FIG. 8, the radio communication terminal 10 connects to a large cell base station 22a with the largest cell radius, among the large cell base stations 22a, 22c in the periphery to which the radio communication terminal can connect.

In contrast, if there exists no large cell base stations 22a . . . in the periphery to which the radio communication terminal 10 located in the small cell SC1 can connect, in step S110 the radio communication terminal 10 connects to the small cell base station 21a.

(2) Handover from Small Cell Base Station to Large Cell Base Station

Figure 10:
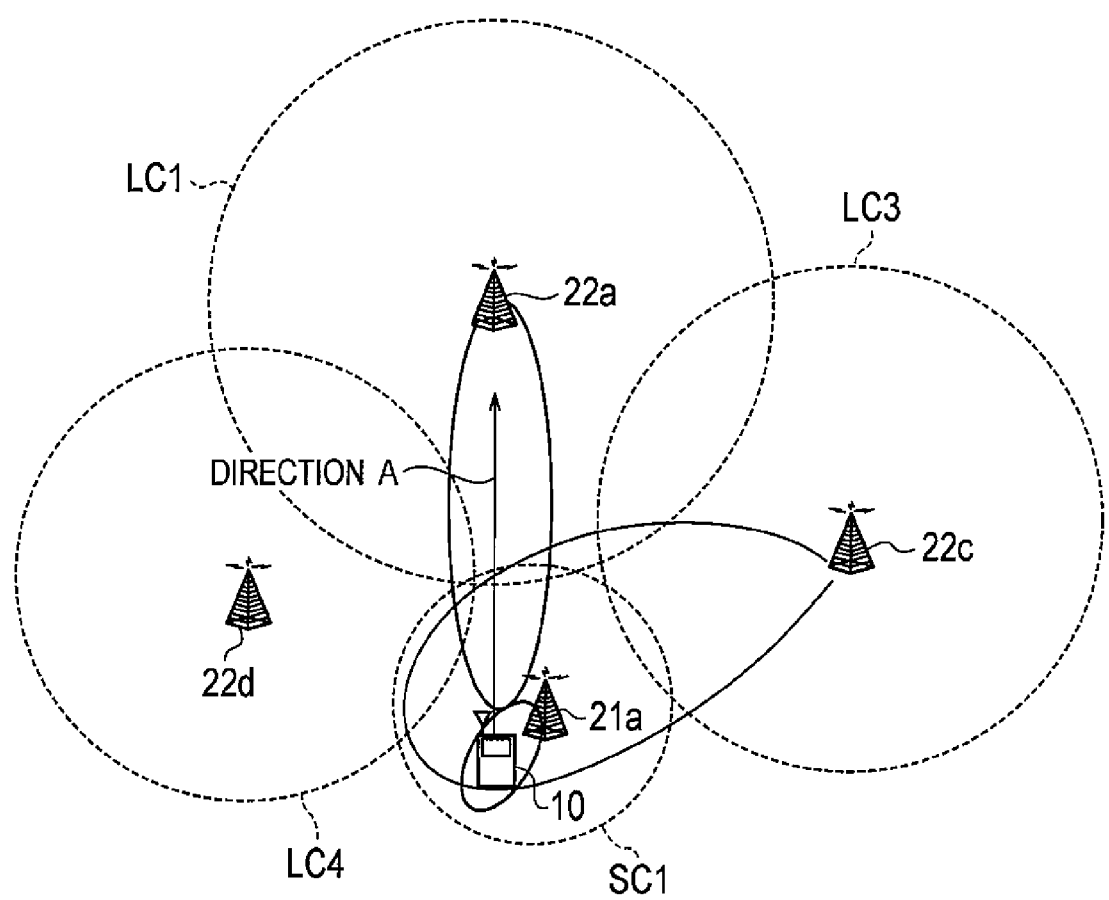
FIG. 10 is a diagram showing an example in which the radio communication terminal according to the embodiments of the present invention is handed over from a small cell base station to a large cell base station.

Operation performed when the radio communication terminal 10 is handed over from the small cell base station 21 in which the radio communication terminal 10 is currently accommodated to the large cell base station 22 will be described with reference to FIG. 10 and FIG. 11. Here, as shown in FIG. 10, it is considered that the moving speed of the radio communication terminal 10 currently connected to the small cell base station 21a becomes faster in a small cell SC1.

Figure 11:
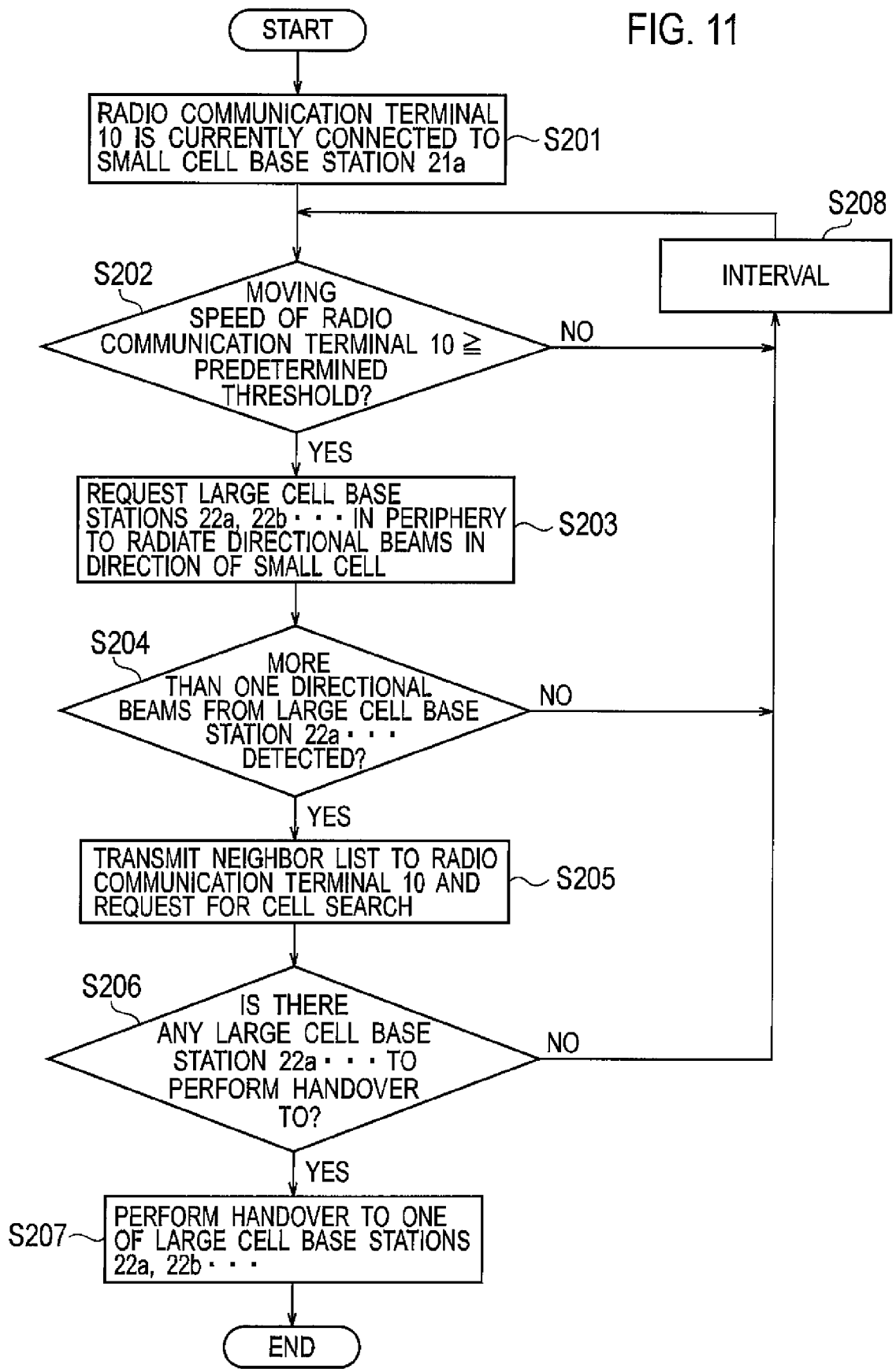
FIG. 11 is a flowchart showing operations of the radio communication terminal according to the embodiments of the present invention when it is handed over from the small cell base station to the large cell base station.

As shown in FIG. 11, in Step S201, the radio communication terminal 10 is located in the small cell SC1 and is currently connected to the small cell base station 21a.

In step S202, the small cell base station 21a currently connecting to the radio communication terminal 10 determines whether or not the moving speed of the radio communication terminal 10 is equal to or more than a predetermined threshold. If the moving speed of the radio communication terminal 10 is equal to or more than the predetermined threshold, the small cell base station 21a operates as a requesting base station described above, and the operation proceeds to step S203. Meanwhile, if the moving speed of the radio communication terminal 10 is less than the threshold, the operation proceeds to step S208.

As steps S203 to S205 are similar to S104 to S106 of FIG. 9, description thereof will be omitted.

In step S206, in cell search based on the neighbor list provided in step S205, the radio communication terminal 10 determines whether or not there exist large cell base stations 22a . . . with the received power of the base station reference signals equal to or more than a predetermined threshold, that is, large cell base stations 22a . . . in the periphery to which the radio communication terminal 10 can be handed over.

If there exists the large cell base stations 22a . . . to which the radio communication terminal 10 can be handed over, in step S207, the radio communication terminal 10 is handed over to one of the large cell base stations 22a . . . , on the neighbor list provided in step S205. In FIG. 10, for example, the radio communication terminal 10 is handed over to a large cell base station 22a with the largest cell radius, among the large cell base stations 22a, 22c in the periphery to which the radio communication terminal 10 can be handed over.

Meanwhile, if there exists no large cell base station 22a . . . in the periphery to which the radio communication terminal 10 can be handed over, the operation returns to step S202 after a predetermined time interval in step S208.

(3) Handover from Large Cell Base Station to Large Cell Base Station

Figure 12:
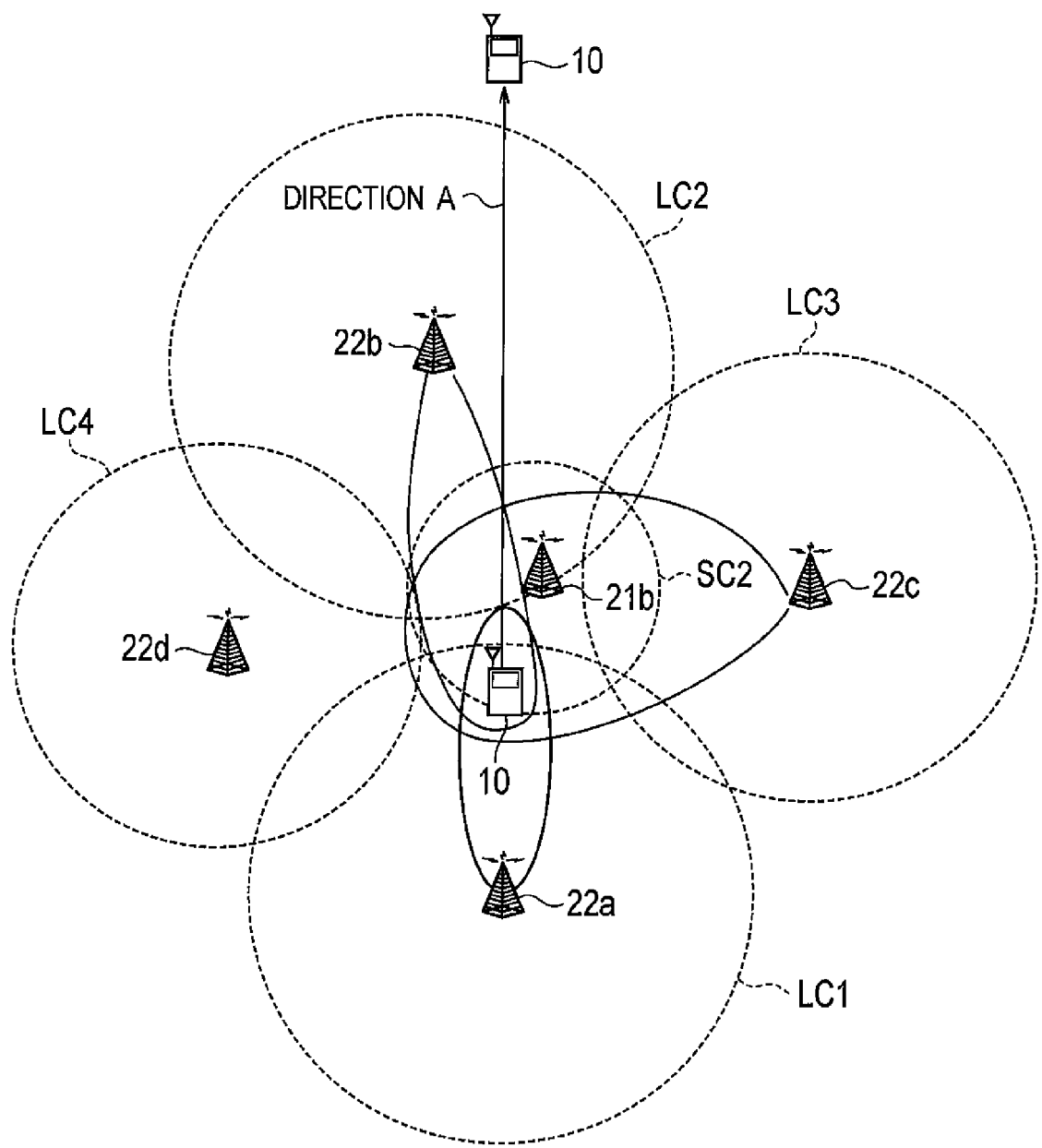
FIG. 12 is a diagram showing an example in which the radio communication terminal according to the embodiments of the present invention is handed over from a large cell base station to a large cell base station.

Operation performed when the radio communication terminal 10 currently connected to the large cell base station 22 requests a handover to the small cell base station 21 will be described hereinafter with reference to FIG. 12 and FIG. 13. Here, as shown in FIG. 12, the radio communication terminal 10 currently connected to the large cell base station 22a moves into the small cell SC2 and requests a handover to the small cell base station 21b.

Figure 13:
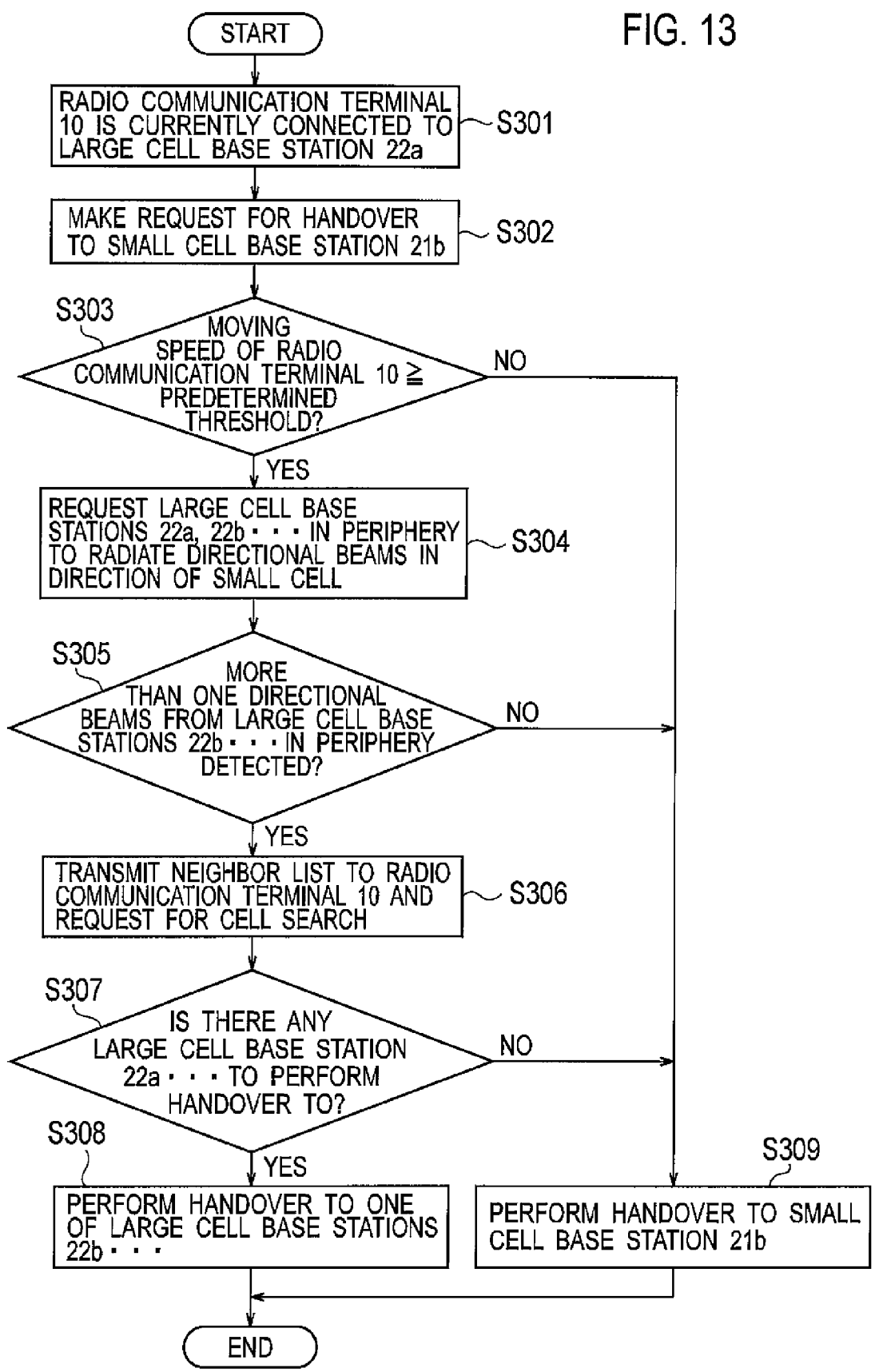
FIG. 13 is a flowchart showing operations of the radio communication terminal according to the embodiments of the present invention when it is handed over from the large cell base station to the large cell base station.

As shown in FIG. 13, in step S301, the radio communication terminal 10 is being connected to the large cell base station 22a.

In step S302, the radio communication terminal 10 moves into the small cell SC2, and requests a handover to the small cell base station 21b.

In step S303, the large cell base station 22a detects the handover request of the radio communication terminal 10 to the small cell base station 21b, and determines whether or not the moving speed of the radio communication terminal 10 is equal to or more than a predetermined threshold. If the moving speed of the radio communication terminal 10 is equal to or more than the predetermined threshold, the large cell base station 22a operates as a requesting base station described above, and the operation proceeds to step S304. Meanwhile, if the moving speed of the radio communication terminal 10 is less than the predetermined threshold, the operation proceeds to step S309, and the radio communication terminal 10 is handed over to the small cell base station 21b.

In step S305, the large cell base station 22a detects the handover request of the radio communication terminal 10 to the small cell base station 21b, and transmits a request to radiate directional beams directed toward the small cell SC2 to the large cell base stations 22b . . . in the periphery, on the basis of the neighbor list acquired from the upper network. In FIG. 12, for example, the large cell base station 22a transmits, to the large cell base stations 22b to 22d in the periphery, a request to radiate directional beams.

Since step S306 is similar to step S106 in FIG. 9, description thereof will be omitted.

In step S307, the radio communication terminal 10 performs cell search on the basis of the neighbor list provided in step S306. The radio communication terminal 10 also determines whether or not there exists a large cell base stations 22b . . . with received power of base station reference signals being equal to or more than a predetermined threshold, that is, the large cell base station 22b . . . in the periphery to which the radio communication terminal 10 can be handed over.

If there exist the large cell base stations 22b . . . in the periphery to which the radio communication terminal 10 can be handed over, in step S308 the radio communication terminal 10 performs the handover to one of the large cell base stations 22b . . . , on the basis of the neighbor list provided in step S307. In FIG. 12, for example, the radio communication terminal 10 is handed over to the large cell base station 22b with the largest cell radius, among the large cell base stations 22b, 22c in the periphery to which the radio communication terminal 10 can be handed over.

Meanwhile, if there exists no large cell base station 22b . . . in the periphery to which the radio communication terminal 10 can be handed over, in step S309, the radio communication terminal 10 is handed over to the small cell base station 21b, which is the handover request destination in step S302.

(4) Handover from Large Cell Base Station to Small Cell Base Station

Figure 14:
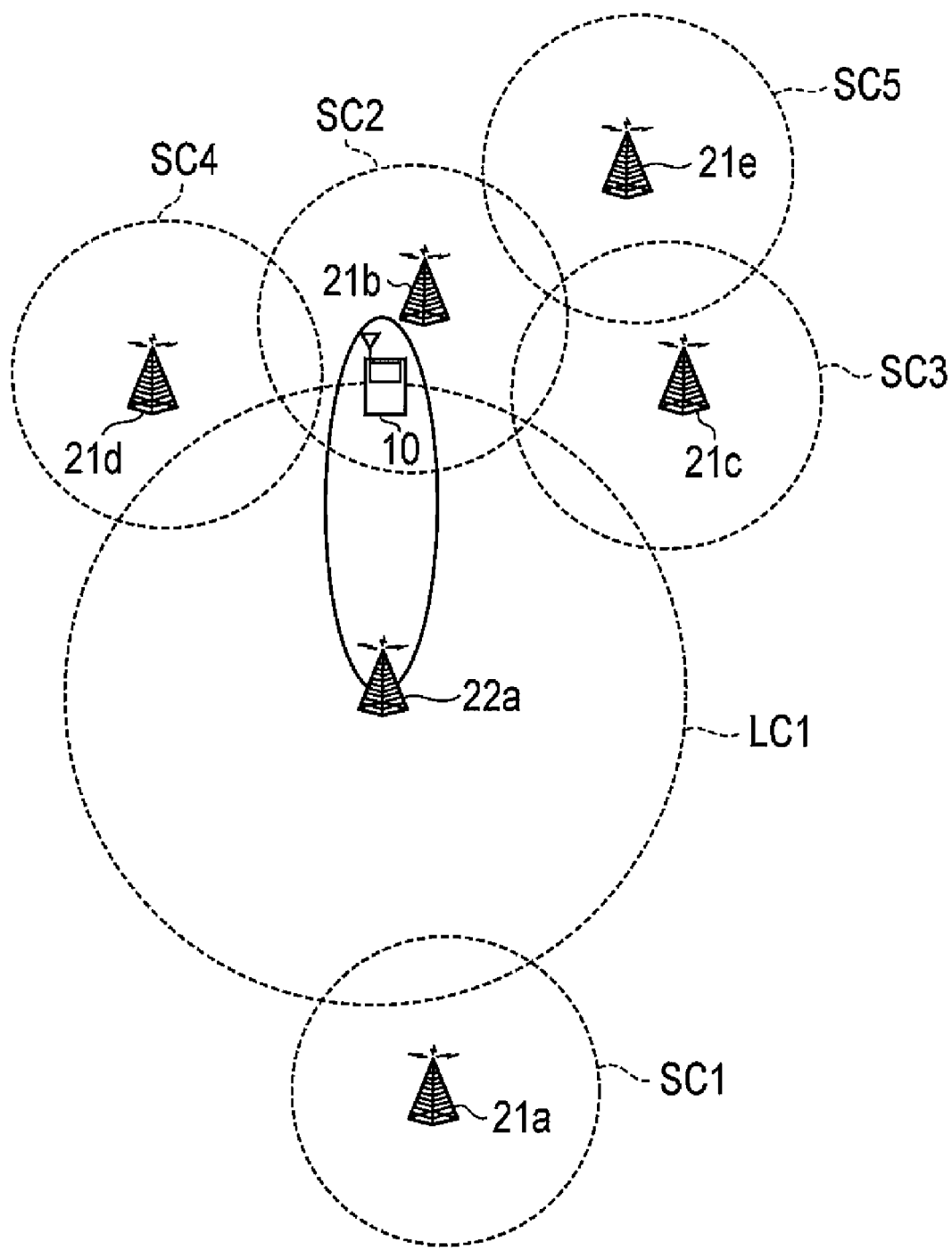
FIG. 14 is a diagram showing an example in which the radio communication terminal according to the embodiments of the present invention is handed over from a large cell base station to a small cell base station.

Operation in which the radio communication terminal 10 is handed over from the large cell base station 22 to the small cell base station 21 when the radio communication terminal 10 reduces its moving speed will be described hereinafter with reference to FIG. 14 and FIG. 15. As shown in FIG. 14, consider that the radio communication terminal 10 currently connected to the large cell base station 22a requests a handover to the small cell base station is 21b as the moving speed has decelerated.

Figure 15:
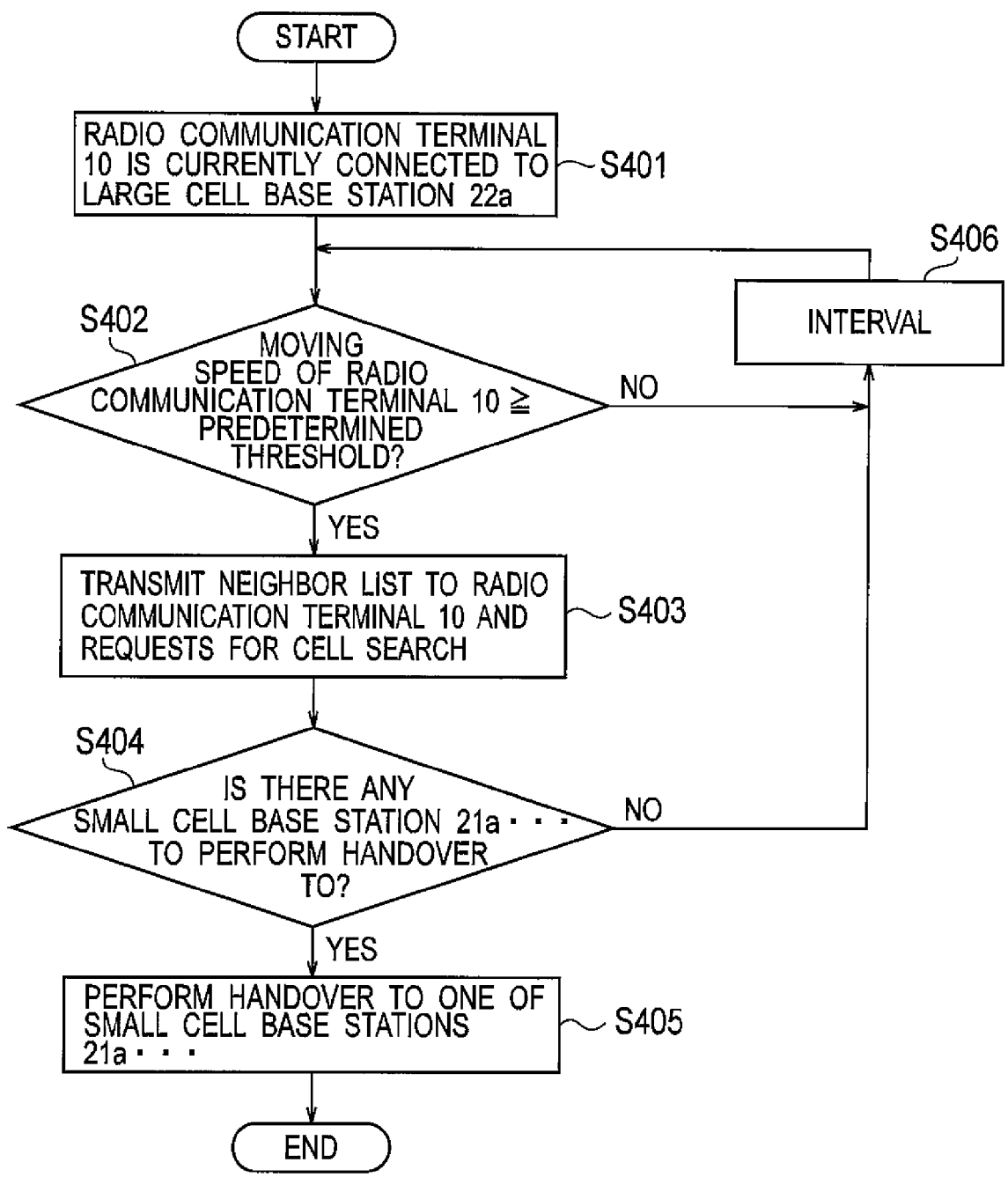
FIG. 15 is a flowchart showing operations of the radio communication terminal according to the embodiments of the present invention when it is handed over from the large cell base station to the small cell base station.

As shown in FIG. 15, in step S401, the radio communication terminal 10 is being connected to the large cell base station 22a.

In step S402, the large cell base station 22a currently connected to the radio communication terminal 10 determines whether or not the moving speed of the radio communication terminal 10 is equal to or more than a predetermined threshold. If the moving speed of the radio communication terminal 10 is less than the predetermined threshold, the operation proceeds to step S403. Meanwhile, if the moving speed of the radio communication terminal 10 is equal to or more than the predetermined threshold, the operation proceeds to step 406.

In step S403, the large cell base station 22a provides the radio communication terminal 10 with a neighbor list acquired from the upper network and including the small cell base stations 21a . . . in the periphery, and requests the radio communication terminal 10 to perform cell search. In FIG. 14, for example, the large cell base station 22a provides the radio communication terminal 10 with a neighbor list including information on the small cell base stations 21a to 21c in the periphery.

In step S404, the radio communication terminal 10 performs the cell search based on the neighbor list provided in step S403. The radio communication terminal 10 also determines whether or not there exist the small cell base stations 21a . . . with the received power of the base station reference signals being equal to or more than the predetermined threshold, that is, the small cell base stations 21a . . . in the periphery to which the radio communication terminal 10 can be handed over.

If there exist the small cell base stations 21a . . . in the periphery to which the radio communication terminal 10 can be handed over, in step S405, the radio communication terminal 10 is handed over to one of the small cell base stations 21a . . . , on the basis of the neighbor list provided in step S403. In FIG. 14, for example, the radio communication terminal 10 is handed over to the small cell base station 21b of the small cell base stations 21b to 21d in the periphery to which the radio communication terminal can be handed over.

In contrast, if there exist no small cell base station 21a . . . in the periphery to which the radio communication terminal 10 can be handed over, the operation returns to step S402 after a predetermined time interval in step S406.

Function and Effect of Communication System and Communication Method According to the Embodiment According to the communication system and the communication method according to the embodiment, when the radio communication terminal 10 located in a small cell moves at high speed, the large cell base station 22 accommodates the radio communication terminal 10. This enables the radio communication terminal 10 to perform handovers appropriately, and reduce the frequency of performing the handovers. Thus, increased processing load of a network and reduced transmission rate due to frequent handovers can be prevented.

In addition, when the radio communication terminal 10 located in the small cell moves at high speed, the radio communication terminal 10 is accommodated not in the small cell base station 21 but in the large cell base station 22. Thus, deterioration of signals due to a tracking error in directional beams transmitted from the small cell base station 21 can be prevented, and thereby the communication quality can be improved.

According to the communication system and the communication method of the embodiment, the beam width of the directional beam is changed depending on moving speed of the radio communication terminal 10. Thus, the radio communication terminal 10 can receive an appropriate directional beam, depending on moving speed.

According to the communication system and the communication method of the embodiment, each of the base station reference signals of the large cell base station 22 transmitted by directional beam from a plurality of the large cell base stations 22 in the periphery of the small cell differs in frequency domain or time domain. Accordingly, the base station reference signals are prevented from interfering with each other.

Thus, the radio communication terminal 10 can receive the base station reference signals of the large cell base stations 22 transmitted by the directional beam with good receiving quality, and easily select the large cell base station 22 being most appropriate to establish connection with, on the basis of each base station reference signal.

According to the communication system and the communication method of the embodiment, the radio communication terminal 10 can easily select the most appropriate large cell base station 22 to establish connection with, on the basis of: the cell radius of the large cell base station 22 that radiates directional beam; the frequency band of the large cell base station; or the area section of the large cell base station.

EXAMPLE OF MODIFICATION

Note that, in the communication system and the communication method according to the embodiment, it is described that the small cell base station 21 and the large cell base station 22 that operate as requesting base stations include the controller 213 having the moving speed acquisition unit 2131 and the directional beam radiation requesting unit 2132.

However, the present invention may not be limited to such the configuration. Separate from the small cell base station 21 and the large cell base station 22 that operate as the requesting base stations, a communication controller (a base station controller) having the moving speed acquisition unit 2131 and the directional beam radiation requesting unit 2132 may be provided on the network. Moreover, such the communication controller (the base station controller) may be provided in other device (radio line control station (RNC), for example) on the network.

Other Embodiments

Although one example of the present invention is described as above, it is only an illustrative embodiment, and does not limit the present invention. Specific configuration of each part or the like may be modified as appropriate.

For example, in the embodiment described above, although a request to radiate directional beam is transmitted to the large cell base stations 22 in the periphery via the radio line control station and the network, the request may be directly sent to the large cell base station 22 in the periphery, or sent via other upper network.

In addition, it is also possible to combine the configuration of each embodiment and that of each modified example. The function and effect of the each embodiment and the each modified example of simply recite the most preferable function and effect arising from the present invention, and the function and effect of the present invention shall not be limited to the each embodiment and the each modified example which are described.

Additionally, the entire content of JP-A 2006-207242 (filed on Jul. 28, 2006) is incorporated herein by reference.

INDUSTRIAL APPLICABILITY

As described above, with the radio communication method, the radio base station, the radio communication terminal, and the base station controller according to the present invention, handovers can be performed appropriately even when the radio communication terminal moves at high speed.

Additionally, the frequency of performing handovers can be reduced and communication quality can be improved. Accordingly they are useful in radio communications such as mobile communications.

The invention claimed is:

1. A radio communication method using:
a first radio base station; and
a second radio base station located adjacent to the first radio base station and including an adaptive array antenna for radiating a dynamic directional beam, the method comprising the steps of:
acquiring moving speed of a radio communication terminal located in a cell formed by the first radio base station;
requesting the second radio base station to radiate the directional beam in a direction of the cell formed by the first radio base station, when the moving speed is equal to or more than a predetermined threshold, wherein when the moving speed is equal to or more than the predetermined threshold, a plurality of the second radio base stations are requested to radiate the directional beams in direction of the cell formed by the first radio base station;
accommodating the radio communication terminal in the second radio base station that has transmitted the directional beam in response to the request; wherein the radio communication terminal is accommodated in one of the second radio base stations that have radiated the directional beams in response to the request;
acquiring a list including identification information of the plurality of second radio base stations that have transmitted the directional beams; and
selecting the second radio base station in which the radio communication terminal is to be accommodated, on the basis of the list,
wherein the list includes at least one piece of information of a cell radius of the second radio base station, a frequency band of the second radio base station, and an area section indicating an area in which the second radio base station is located.

2. The radio communication method according to claim 1, further comprising the step of:
transmitting base station reference signals of a plurality of the second radio base stations, from the second radio base stations by use of the directional beams,
wherein the plurality of the base station reference signals differ from each other in frequency domain or time domain.

3. The radio communication method according to claim 1, wherein
the first radio base station forms a small cell, and
the second radio base station forms a large cell being larger than the small cell.

4. A radio base station located adjacent to a first radio base station and including an adaptive array antenna for radiating a dynamic directional beam, the radio base station comprising:
a receiver configured to receive a request to radiate the directional beam in a direction of a cell formed by the first radio base station, when moving speed of a radio communication terminal located in the cell formed by the first radio base station is equal to or more than a predetermined threshold, wherein when the moving speed is equal to or more than the predetermined threshold, a plurality of radio base stations are requested to radiate directional beams in the direction of the cell formed by the first radio base station; and
a directional beam controller configured to accommodate the radio communication terminal by radiating the directional beam in response to the request to radiate, wherein the radio communication terminal is accommodated in one of the plurality of radio base stations that have radiated directional beams in response to the request to radiate, wherein
the identification information of the radio base station is on a list including identification information of the plurality of radio base stations that have radiated the directional beams,
the radio base station is selected to accommodate the radio communication terminal on the basis of the list, and
the list includes at least one piece of information of a cell radius of the radio base station, a frequency band of the radio base station, and an area section indicating an area in which the radio base station is located.

5. A radio communication terminal in a radio communication system including:
a first radio base station; and
second radio base stations each located adjacent to the first radio base station and each including an adaptive array antenna for radiating a dynamic directional beam,
the radio communication terminal comprising:
an acquisition unit configured to acquire a list including identification information of the second radio base stations that have radiated the directional beams in a direction of a cell formed by the first radio base station, when moving speed of the radio communication terminal in the cell formed by the first radio base station is equal to or more than a predetermined threshold; and
a selector configured to select the second radio base station in which the radio communication terminal is to be accommodated, on the basis of the list,
wherein the list includes at least one piece of information of a cell radius of the second radio base station, a frequency band of the second radio base station, and an area section indicating an area in which the second radio base station is located.

6. The radio communication terminal according to claim 5 wherein:
the receiver receives base station reference signals of the second radio base stations transmitted by use of the directional beams from the plurality of the second radio base stations, on the basis of the frequency domain and the time domain associated with the identification information of the second radio base stations, and
the selector selects the second radio base station in which the radio communication terminal is to be accommodated, on the basis of received power of the base station reference signals.

7. A base station controller in a radio communication system including:
a first radio base station; and
a second radio base station located adjacent to the first radio base station and including an adaptive array antenna for radiating a dynamic directional beam,
the base station controller comprising:
a moving speed acquisition unit configured to acquire moving speed of a radio communication terminal located in a cell formed by the first radio base station;
a requesting unit configured to request the second radio base station to radiate the directional beams in the direction of the cell formed by the first radio base station, when the moving speed is equal to or more than a predetermined threshold, wherein when the moving speed is equal to or more than the predetermined threshold, a plurality of the second radio base stations are requested to radiate directional beams in the direction of the cell formed by the first radio base station;

an accommodating unit configured to accommodate the radio communication terminal in the second radio base station that has transmitted the directional beam in response to the request; wherein the radio communication terminal is accommodated in one of the second radio base stations that have radiated directional beams in response to the request;

an acquisition unit configured to acquire a list including identification information of the plurality of second radio base stations that have transmitted directional beams; and a selector configured to select the second radio base station in which the radio communication terminal is to be accommodated, on the basis of the list, wherein the list includes at least one piece of information of a cell radius of the second radio base station, a frequency band of the second radio base station, and an area section indicating an area in which the second radio base station is located.

* * * * *